(12) United States Patent
Tsang et al.

(10) Patent No.: US 11,496,588 B2
(45) Date of Patent: Nov. 8, 2022

(54) CLUSTERING LAYERS IN MULTI-NODE CLUSTERS

(71) Applicant: MICRO FOCUS LLC, Santa Clara, CA (US)

(72) Inventors: Chiu Wai Tsang, Sunnyvale, CA (US); Christopher Johnson, Fort Collins, CO (US)

(73) Assignee: Micro Focus LLC, Santa Clara, CA (US)

( * ) Notice: Subject to any disclaimer, the term of this patent is extended or adjusted under 35 U.S.C. 154(b) by 825 days.

(21) Appl. No.: 15/188,312

(22) Filed: Jun. 21, 2016

(65) Prior Publication Data

US 2017/0366624 A1    Dec. 21, 2017

(51) Int. Cl.

| | |
|---|---|
| *H04L 67/51* | (2022.01) |
| *H04L 41/12* | (2022.01) |
| *H04L 47/125* | (2022.01) |
| *G06F 16/22* | (2019.01) |
| *G06F 16/23* | (2019.01) |
| *G06F 16/27* | (2019.01) |

(52) U.S. Cl.
CPC .............. *H04L 67/51* (2022.05); *G06F 16/22* (2019.01); *G06F 16/2379* (2019.01); *G06F 16/278* (2019.01); *H04L 41/12* (2013.01); *H04L 47/125* (2013.01)

(58) Field of Classification Search
CPC .............. H04L 41/082; H04L 41/0856; H04L 41/0866; H04L 67/16; H04L 67/18; H04L 41/12; H04L 47/125; G06F 3/064; G06F 9/5061; G06F 9/5077; G06F 11/301; G06F 15/161; G06F 17/30312; G06F 17/30377; G06F 17/30584
See application file for complete search history.

(56) References Cited

U.S. PATENT DOCUMENTS

| | | | |
|---|---|---|---|
| 6,523,036 B1 * | 2/2003 | Hickman | ................ G06F 16/27 |
| | | | 707/704 |
| 7,685,131 B2 * | 3/2010 | Batra | ...................... G06F 16/27 |
| | | | 707/999.01 |
| 8,676,753 B2 | 3/2014 | Sivasubramanian et al. | |
| 8,706,852 B2 | 4/2014 | Kunze et al. | |
| 10,216,770 B1 * | 2/2019 | Kulesza | ................... G06F 9/50 |

(Continued)

OTHER PUBLICATIONS

Costa, C.H. et al, Sharding by Hash Partitioning a Database Scalability Pattern to Achieve Evenly Sharded Database Clusters, Apr. 7, 2015, 8 pgs, Research Paper.

(Continued)

*Primary Examiner* — Kamal B Divecha
*Assistant Examiner* — Sandarva Khanal
(74) *Attorney, Agent, or Firm* — Sheridan Ross P.C.

(57) ABSTRACT

Examples include a multi-node cluster having a node with a clustering layer. The clustering layer may be located between an application programming interface (API) layer and a service layer and the multi-node cluster may be associated with a database. In some examples, the clustering layer may discover whether a number of nodes associated with the multi-node cluster has changed. Based, at least in part, on the determination that the number of nodes associated with the multi-node cluster has changed, at the clustering layer, the database may be sharded and a new API call may be issued to the API layer.

20 Claims, 8 Drawing Sheets

(56) References Cited

U.S. PATENT DOCUMENTS

| | | | | |
|---|---|---|---|---|
| 2007/0168336 A1* | 7/2007 | Ransil | ............... | G06F 16/958 |
| 2011/0060798 A1* | 3/2011 | Cho | ............... | H04L 65/4084 |
| | | | | 709/206 |
| 2012/0180070 A1* | 7/2012 | Pafumi | ............... | G06F 9/542 |
| | | | | 719/313 |
| 2012/0246202 A1* | 9/2012 | Surtani | ............ | G06F 16/289 |
| | | | | 707/812 |
| 2015/0127625 A1* | 5/2015 | Bulkowski | .......... | G06F 16/27 |
| | | | | 707/703 |
| 2015/0254325 A1 | 9/2015 | Stringham | | |
| 2015/0356097 A1 | 12/2015 | Chopra et al. | | |
| 2016/0179979 A1* | 6/2016 | Aasman | ............ | G06F 16/278 |
| | | | | 707/603 |
| 2016/0323367 A1* | 11/2016 | Murtha | ............... | H04L 67/10 |

OTHER PUBLICATIONS

Potvin, Pascali, et al. "Micro Service Cloud Computing Pattern for Next Generation Networks." arXiv preprint arXiv:1507.06858 (2015), 12 pgs.

European Patent Office, Extended European Search Report for Application 17170266.5 dated Jul. 14, 2017 (14 pages).

VOLTdb: "Using VoltDB" retrieved from Internet: http://downloads.voltdb.com/documentation/v5docs/UsingVoltDB.pdf, Jan. 15, 2016 (353 pages).

* cited by examiner

CLUSTERING LAYERS IN MULTI-NODE CLUSTERS

BACKGROUND

An application, like a web service application or a cloud-based application, may expand its offerings or achieve more wide-spread use. An application may also contract or see a decrease in use. Accordingly, applications may be scaled to accommodate growth or reduction.

BRIEF DESCRIPTION OF THE DRAWINGS

The following detailed description references the drawings, wherein.

DETAILED DESCRIPTION

Figure 1:
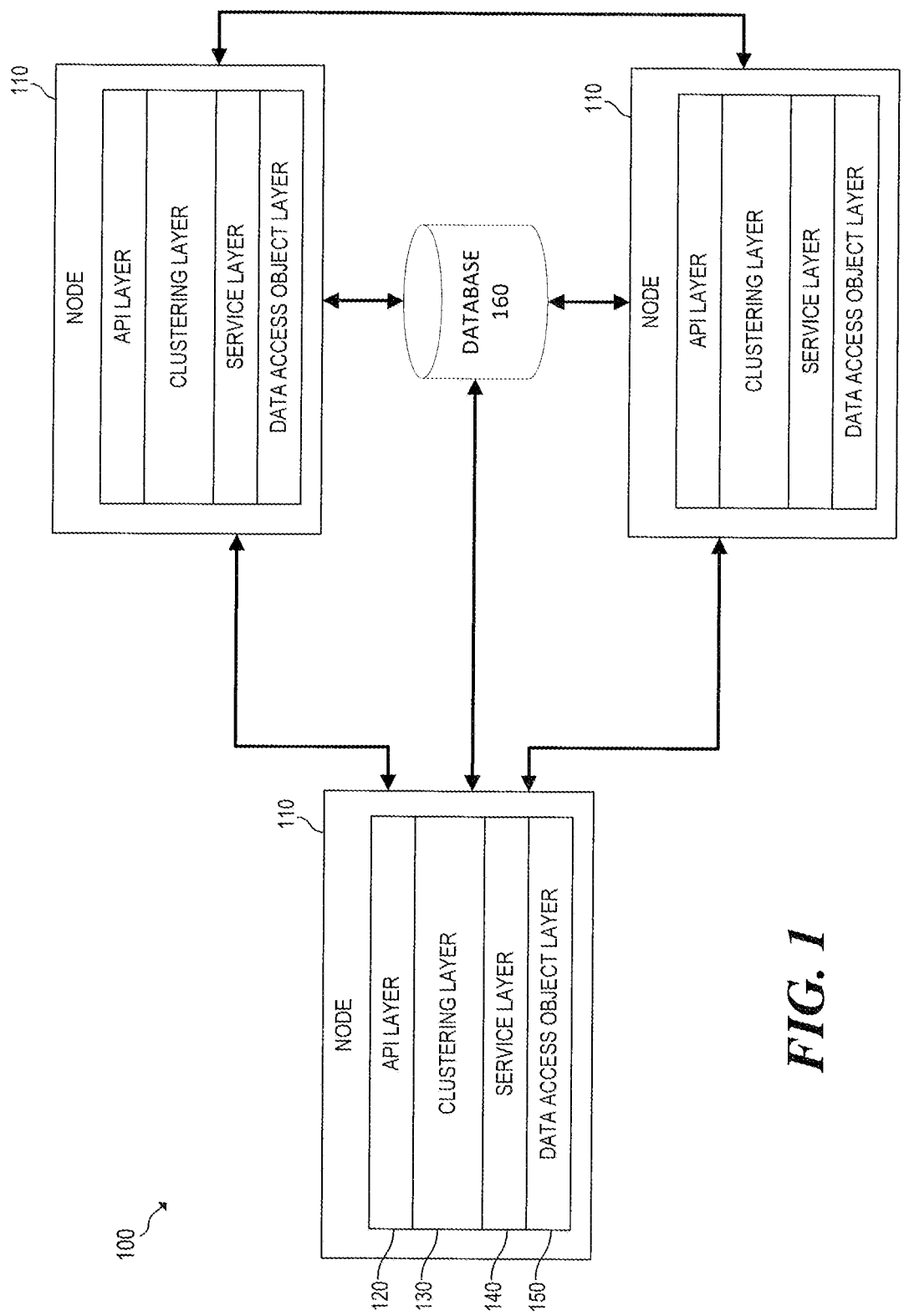
FIG. 1 is a block diagram of an example multi-node cluster in which each node has a clustering layer.

Applications undergoing change may scale to reflect the change. For instance, an application that is experiencing a decline in usage may be scaled down or scaled in to lower costs. On the other hand, an application that is expanding its services or offerings may be scaled up or scaled out. An application that is scaled up or down refers to vertical scaling in which resources, such as processing power or memory, may be added to or removed from a node (e.g., a machine, computer or server) in a system. An application that is scaled in or out refers to horizontal scaling in which new nodes may be added to existing nodes in a system such as a multi-node cluster. When an application is scaled, an associated database may also be scaled. An unscaled database associated with a scaled application, may act as a bottleneck within the system or may result in an inefficient use of resources.

In many instances, vertically scaling an application or database may be relatively straightforward, involving few, if any, changes to the overall structural framework and layers of the application and database. But horizontally scaling an application or database may involve more complex modifications. While an application may be horizontally auto-scaled via an orchestration framework, the application's database may not auto-scale in accordance with the same framework. For example, a database such as a relational structured query language (SQL) database may have a structural framework ill-suited to horizontal auto-scaling.

In some examples, a database management solution may be employed at the database and/or at a data access object layer to horizontally scale the database. In other examples, a proxy management service may provide a database management solution. However, such solutions may entail an in-depth knowledge of the database structure, may involve complex modifications at the database, and may involve a new or modified application programming interface (API) library as well as additional modifications to the data access or service layers. In some examples, to avoid horizontally scaling a database ill-suited to such scaling, a new database may be migrated to accommodate a scaled application. But migrating databases may be prohibitively expensive, may result in costly application down-time, and may be inefficient in an agile development environment.

Examples described herein may allow for horizontal scaling and sharding (e.g., partitioning) of a database amongst nodes within a multi-node cluster via a clustering layer that is agnostic to database structure and minimizes or avoids altogether modifications to the database and existing application layers such as the data access object layer, service layer, and API layer. In the examples described herein, the clustering layer may be located between an API layer and a service layer of a node. In such examples, the clustering layer may intercept an API call from the API layer to the service layer, determine whether the API call is at least one of a request to create, to retrieve, or to delete a resource, and based (at least in part) on the determination, may shard the database and/or forward the API call. In some examples described herein, a clustering layer within a node of a multi-node cluster may discover whether a number of nodes within the multi-node cluster has changed. Based (at least in part) on a determination that the number of nodes has changed, the clustering layer may automatically shard the database such that the database and its database resources are suitably distributed amongst the nodes of the multi-node cluster.

In some examples described herein, a node of a multi-node cluster may comprise a processing resource and a machine-readable storage medium comprising instructions executable by the processing resource to receive an API call to access a database at an API layer and forward the API call to a service layer. The storage medium may further comprise instructions to intercept the API call to access a database from the API layer at a clustering layer between the API layer and the service layer. The clustering layer may perform at least one of sharding the database and forwarding the API call. In some examples, the storage medium may also comprise instructions to access the database at a data access object layer. In examples described herein, a determination, action, etc., that is said to be based on a given condition may be based on that condition alone or based on that condition and other condition(s).

In some examples described herein, a machine-readable storage medium may be encoded with instructions executable by a processing resource of a node of a multi-node cluster to receive, at an API layer, an API call and forward the API call to a service layer. The storage medium may further comprise instructions to intercept the API call at a clustering layer and determine whether the API call is at least one of a request to create a database resource in a database, a request to retrieve the database resource from the database, or a request to delete the database resource from the database. Based (at least in part) on a determination that the API call is at least one of the request to create, to retrieve, or to delete the database resource, determine a location of the database resource. Based (at least in part) on a determination that the API call is a request to create a database resource and a determination that the location of the database resource is the node, at the clustering layer, shard the database and forward the API call to the service layer.

In some examples described herein, the machine-readable storage medium may also comprise instructions to discover, at the clustering layer, whether a number of nodes associated with the multi-node cluster has changed. Based (at least in part) on a determination that the number of nodes has changed, the machine-readable storage medium may also comprise instructions to, at the clustering layer, shard the database and issue a new API call to the API layer.

In some examples described herein, a method may involve discovering, by a processing resource of a node of a multi-node cluster, at a clustering layer between an API layer and a service layer, whether a number of nodes associated with the multi-node cluster has changed. Based (at least in part) on the discovery that the number of nodes has changed, the method may further comprise, at the clustering layer, sharding the database and issuing a new API call to the API layer.

In some examples described herein, the method of the node of the multi-node cluster may also involve receiving an API call at the clustering layer and determining whether the API call is at least one of a request to create a database resource in a database, a request to retrieve a database resource from a database, or a request to delete a database resource from a database, and based (at least in part) on the determination that the API call is at least one of the request to create, to retrieve, or to delete the database resource, determining, at the clustering layer, a location of the database resource. Based (at least in part) on the determination that the API request is at least one of the request to create, to retrieve, or to delete a database resource and based (at least in part) on the determination of the location of the database resource, at the clustering layer, performing at least one of sharding the database and forwarding the API call.

Figure 9:
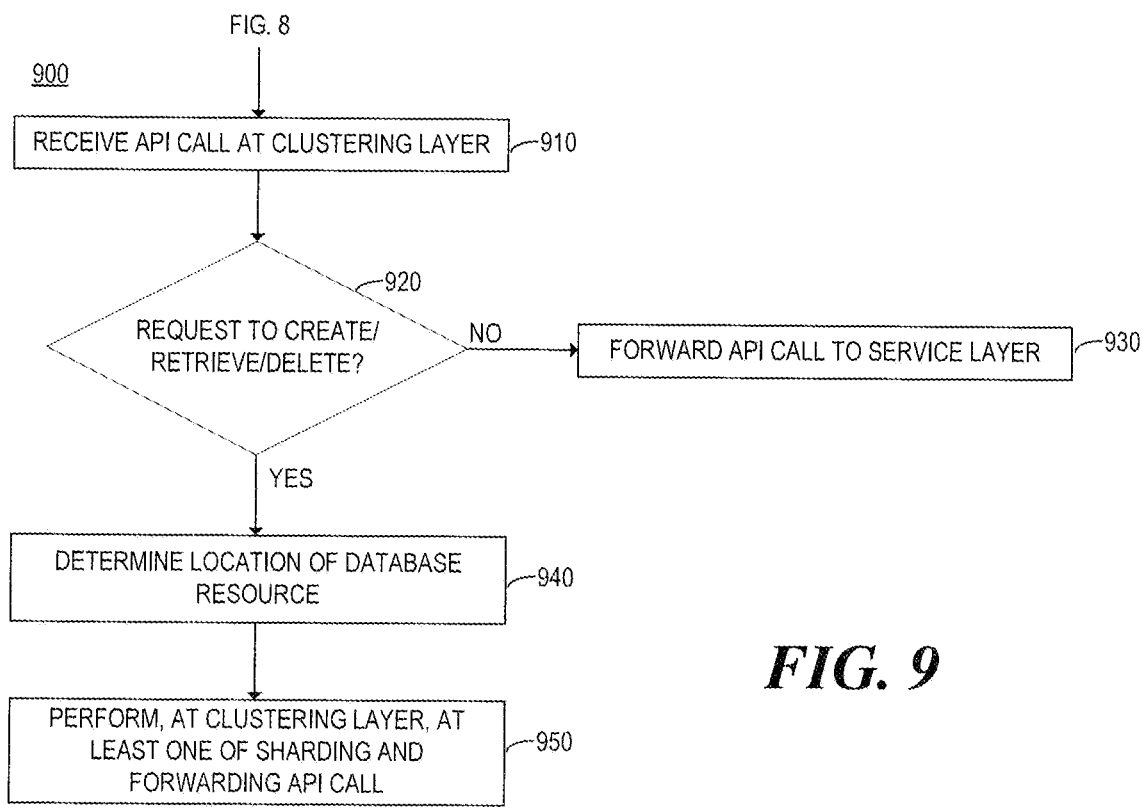
FIG. 9 is a flow chart of an example method for a node in a multi-node cluster including intercepting an API call at a clustering layer, determining whether the API call is at least one of a request to create, to retrieve, and to delete a database resource, determining a location of the database resource, and performing certain tasks based on the determinations.

Referring now to the drawings, FIG. 1 is a block diagram of an example multi-node cluster 100 (comprising nodes 110) that implements an application associated with a database 160. In the example of FIG. 9, database 160 may be horizontally auto-scaled via clustering layer 130. A multi-node cluster, as described herein, may refer to multiple nodes that work together as a single system. In some examples, each node of the multi-node cluster may utilize a same operating system configuration and a same or similar hardware configuration. In other examples, nodes of the multi-node cluster may utilize differing operating system configurations or differing hardware configurations. A node may be any networking or computing device suitable for execution of the functionality described below. As used herein, a node may be a desktop computer, laptop (or notebook) computer, workstation, tablet computer, mobile phone, smart device, switch, router, server, blade enclosure, or any other processing device or equipment including a processing resource. Although three nodes 110 are illustrated, multi-node cluster 100 may comprise any number of suitable nodes.

Each node 110 is associated with database 160. Database 160 may be any database suitable for use with a multi-node cluster, including a relational database, a dimensional database, a post-relational database, an object-oriented database, any combination of the above, or the like. In some examples, database 160 is a relational structured query language (SQL) database.

In some examples, each node 110 owns or stores a shard (e.g., partition) of database 160. As described herein, a shard of a database may involve a horizontal partition of data in a database. Each database shard may refer to an individual partition of the database. In addition, each shard may be stored on a separate node and may be stored on a separate database instance associated with the node. In some examples, each node of a multi-node cluster may store a shard (or partition) of the database. In other examples, some, but not all, of the nodes of the multi-node cluster may hold a shard of the database.

Nodes 110 of multi-node cluster 100 each comprise an application programming interface (API) layer 120, a clustering layer 130, a service layer 140, and a data access object layer 150. Each layer may comprise a set of classes having a similar set of dependency relationships with other layers. The layers may be implemented using electronic circuitry (e.g., via components comprising any combination of hardware and programming to implement the functionalities described herein), in the form of instructions executable by a processing resource and encoded on a machine-readable storage medium, or a combination thereof.

In some examples, node 110 may receive an API call. As used herein, an API call may represent a requested operation, function, or routine to be performed by an application implemented by the multi-node cluster and that is recognized by the API layer of the application. Upon receiving an API call at node 110, API layer 120, clustering layer 130, service layer 140, and/or data access object layer 150 may together process and respond to the API call.

As depicted in FIG. 1, each of nodes 110 may communicate with one another via a network or communication link. In one example, nodes 110 may communicate via a gossip protocol over the network or via communication links to determine whether a new node 110 has been added to multi-node cluster 100 or a node 110 has been removed from multi-node cluster 100. In another example, a node 110 may multicast or broadcast a received API call to each node 110 over the network or via communication links to process the API call. In some examples, the implementation of multi-node cluster 100 described herein in relation to FIG. 1 may be employed in relation to any of FIGS. 2-9.

Figure 2:
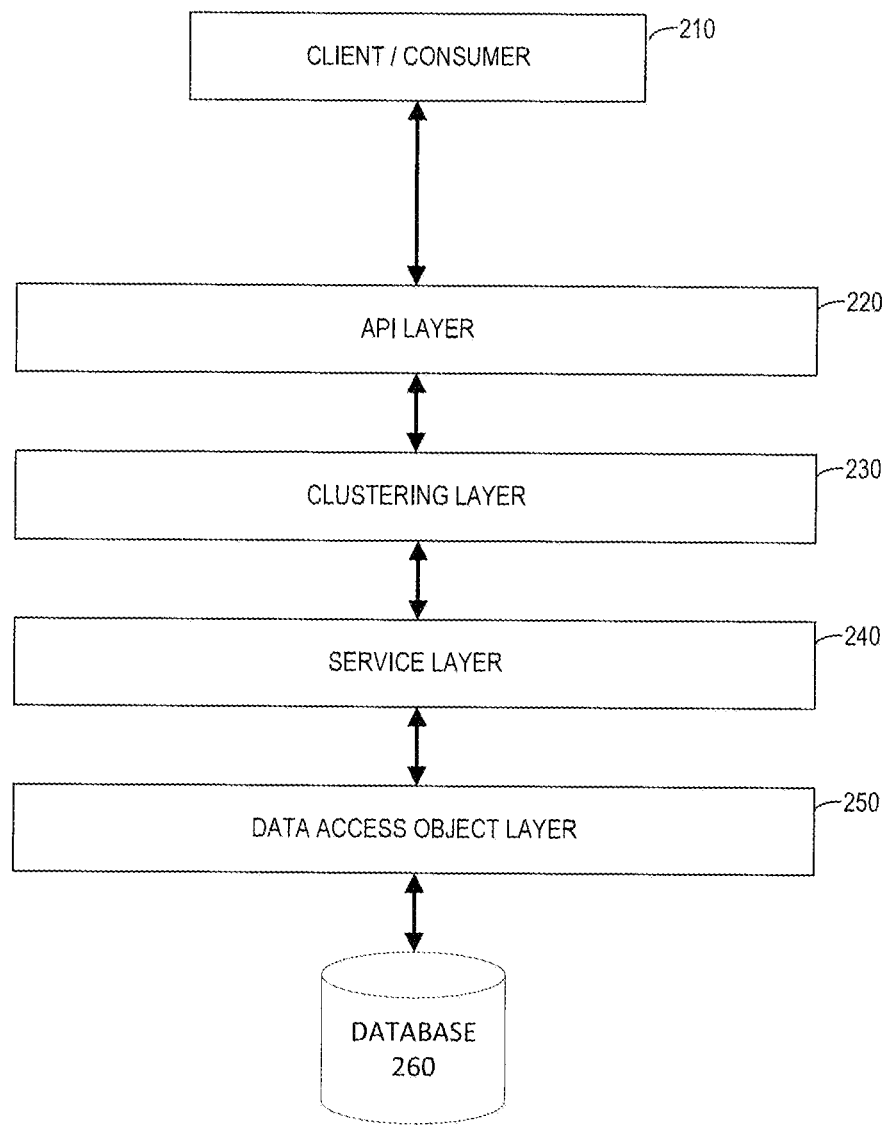
FIG. 2 is a block diagram of an example layer framework of a node.

FIG. 2 is a block diagram of an example layer framework of a node, such as node 110 within multi-node cluster 100. Although FIG. 2 is described with reference to FIG. 1, other systems can be utilized (e.g., multi-node cluster 300 of FIG. 3, described below). In the example of FIG. 2, each layer may comprise a set of classes having a similar set of dependency relationships with other layers. The layers may be implemented using electronic circuitry (e.g., via components comprising any combination of hardware and programming to implement the functionalities described herein), in the form of instructions executable by a processing resource (not shown) and encoded on a machine-readable storage medium (not shown), or a combination thereof.

As depicted in FIG. 2, a client or consumer 210 may issue an API call to an application, for example, a web services application, implemented by multi-node cluster 100. The client/consumer 210 may include a client device or a user. In the example of a web services application, the API call may originate from a web browser, for instance. The API call may be received by an API layer 220 within a node 110. In some examples, the API call may be a request to access database 260. In some such examples, the API call may be a request to create (e.g., write), retrieve (e.g., read), or delete a database resource from database 260.

In some examples, API layer 220 may comprise an interface between client/consumer 210 and the functionality of an application. API layer 220 may be located within node 110 of multi-node cluster 100 and may provide a common language to interact with the application. This common language may be referred to as an API library and may comprise API calls. In some examples, API layer 220 may recognize a set of API calls within its API library and support processing of those calls. Based (at least in part) on the API call, API layer 220 may forward the API call to a service layer 240 for completion or processing of the requested operation, function, or routine. In other examples, API layer 220 may receive an API call and instead forward the API call to clustering layer 230.

As depicted in FIG. 2, clustering layer 230 may be located between API layer 220 and service layer 240. In some examples, clustering layer 230 may discover whether the number of nodes associated with multi-node cluster 100 has changed. If so, clustering layer 230 may shard database 260 to accommodate the added or removed node. As used herein, sharding may refer to partitioning of a database between nodes in a multi-node cluster. For instance, in a multi-node cluster such as that in FIG. 1 having three nodes 110, each node 110 associated with its own database shard, if a new node is added, a new database shard may be associated with the new node. Clustering layer 230 may shard database 260 amongst the now four database shards, distributing database resources from the original database shards to the new database shard. If, on the other hand, a node 100 is removed from multi-node cluster 100, clustering layer 230 may shard database 860 amongst the now two database shards, distributing database resources from the database shard associated with the removed node to the remaining two database shards.

To distribute the database resources, in some examples, clustering layer 230 may issue a set of API calls to retrieve database resources from a database shard associated with one node of multi-node cluster 100 and create those database resources at another database shard associated with a different node of multi-node cluster 100. Sharding database 260 at clustering layer 230 via API calls from the existing API library may allow for automatic scaling of database 260 and load balancing within multi-node cluster 100 without an in-depth knowledge of the database structure of database 260, without modification to the database structure of database 260, without modification of API layer 220, and without modification of data access object layer 250.

Clustering layer 230 may also intercept or receive each API call forwarded by API layer 220, whether sent to service layer 240 or clustering layer 220. Based (at least in part) on the API call, clustering layer 230 may perform a set of tasks. For example, if the API call is a request to create a database resource, clustering layer 230 may shard database 260 by assigning the database resource to a database shard. If the database resource is assigned to the database shard associated with node 110, clustering layer 230 may forward the API call to service layer 240 for further processing. If, however, the database resource is assigned to a database shard associated with another node 110, clustering layer 230 may forward the API call to the API layer of another node. In another example, if the API call is a request to retrieve or delete a database resource, clustering layer 230 may attempt to determine a location of the database resource based (at least in part) on the API call. If the location is unknown, clustering layer 230 may forward the API call to each node of multi-node cluster 100 and to service layer 240 for further processing. If the location is known, depending on the location, clustering layer 230 may forward the API call to service layer 240 for further processing or to another node within multi-node cluster 100.

As depicted in FIG. 2, service layer 240 may be located between clustering layer 230 and data access object layer 250. Service layer 240 may comprise a set of service processes and may facilitate or support processing of an API call. In some examples, service layer 240 may provide a function or service requested as part of an API call. Service layer 240 may receive an API call from clustering layer 230 and based (at least in part) on the API call, may interface with data access object layer 250 to support processing of the API call. In other examples, service layer 240 may interface with another application to support processing of the API call.

Data access object layer 250 may provide an interface between an application's functionality and a database 260. Data access object layer 250 may receive an API call from service layer 240 and based (at least in part) on the API call, may access database 260 to create, retrieve, and/or delete a database resource within database 260. In some examples, data access object layer 250 may be database-specific, such that it involves accesses to a specific database or databases. In other examples, data access object layer 250 may be database-independent and capable of accessing many types of databases.

As described herein, the example layer framework of FIG. 2 may be part of an application, applications, or component(s) installed on a node within a multi-node cluster that implements the application. In some examples, functionalities described herein in relation to FIG. 2 may be provided in relation to any of FIGS. 1 and 3-9.

Figure 3:
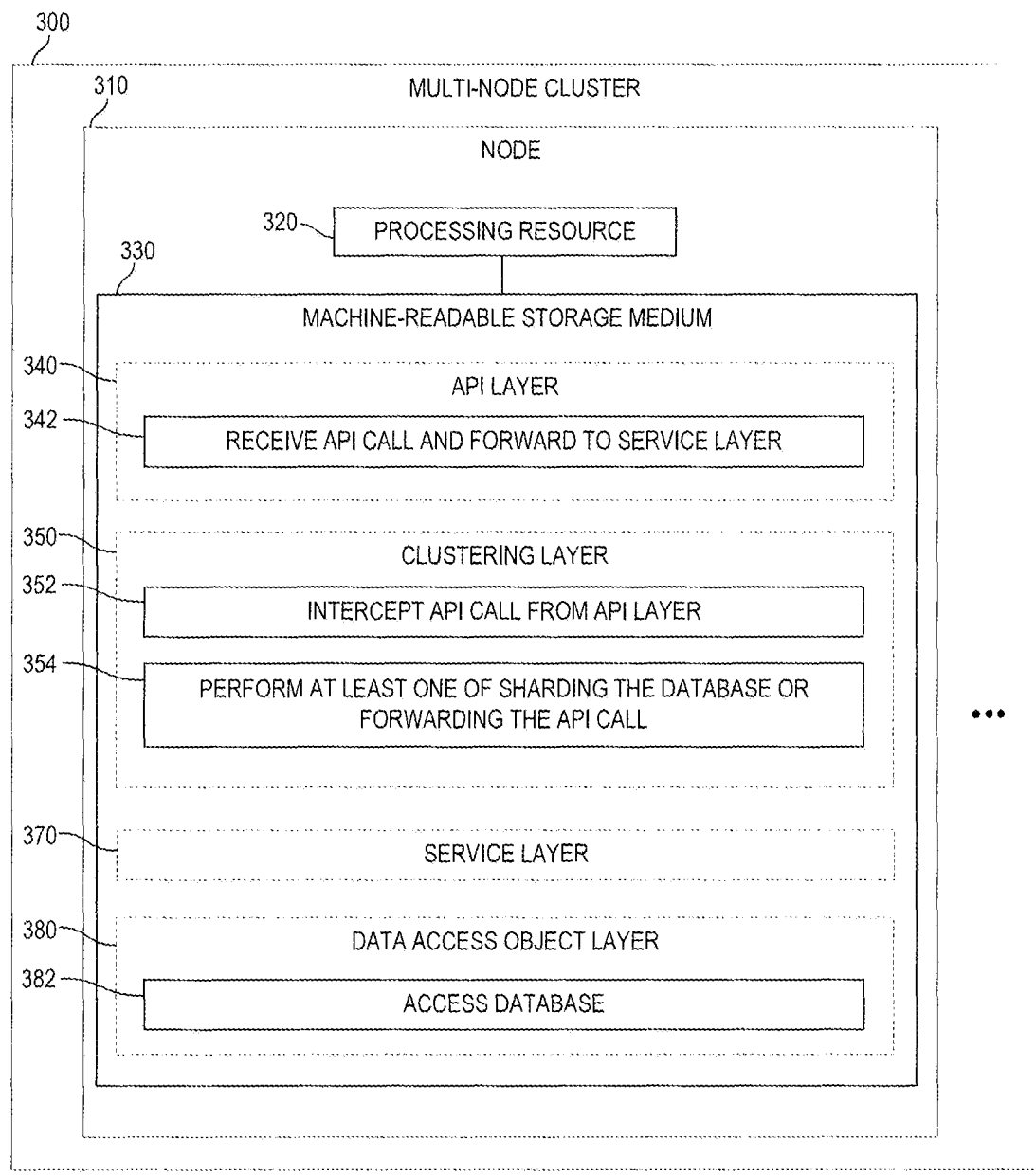
FIG. 3 is a block diagram of an example node in a multi-node cluster having an application programming interface (API) layer, a clustering layer, a service layer, and a data access object layer.

Further examples are described in relation to FIG. 3. FIG. 3 is a block diagram of an example multi-node cluster 300 having a node 310, a processing resource 320, and a machine-readable storage medium 330. Although a single node 310 is illustrated in FIG. 3, in examples described herein, a multi-node cluster may involve any suitable number of nodes more than one.

Node 310 includes processing resource 320. In examples described herein, a processing resource may include, for example, one processor or multiple processors included in a single node or distributed across multiple nodes. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof. Processing resource 320 may fetch, decode, and execute instructions stored on storage medium 330 to perform the functionalities described below in relation to instructions 342, 352, 354, and 382. In other examples, the functionalities of any of the instructions of storage medium 330 may be implemented in the form of electronic circuitry, in the form of executable instructions encoded on a machine-readable storage medium, or a combination thereof.

As depicted in FIG. 3, node 310 may also include a machine-readable storage medium 330 comprising (e.g., encoded with) instructions 342, 352, 354, and 382 executable by processing resource 320 to implement functionalities described herein in relation to FIG. 3. In some examples, storage medium 330 may include additional instructions. In other examples, the functionalities described herein in relation to instructions 342, 352, 354, and 382, and any additional instructions described herein in relation to storage medium 330, may be implemented at least in part in electronic circuitry (e.g., via components comprising any combination of hardware and programming to implement the functionalities described herein).

As used herein, a machine-readable storage medium may be any electronic, magnetic, optimal, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In the example of FIG. 3, storage medium 330 may be implemented by one machine-readable storage medium, or multiple machine-readable storage media.

As depicted in the example of FIG. 3, machine-readable storage medium 330 may comprise several layers, including an API layer 340, a clustering layer 350, a service layer 370, and a data access object layer 380. While FIG. 3 depicts four layers, an application may utilize more or less layers as appropriate. Each of the layers may be implemented at least in part in electronic circuitry and via any combination of hardware and programming to implement the functionalities of the layers, as described below.

In the example of FIG. 3, instructions 342 may receive an API call to access a database at API layer 340. In some examples, the API call may be received from a client device such as another node. In other examples, the API call may be received via a user interface from a user or consumer of the application. An API call to access a database may include, in some examples, a request to create a database resource in the database, a request to retrieve a database resource from the database, or a request to delete a database resource in the database. The API call to access a database may also include a request to move a database resource in the database or a request to modify a database resource in the database. These requests may comprise a request to retrieve, delete, and/or create the database resource. As used herein, a database resource may refer to a resource (e.g., data) within a database. In other examples, the API call may also involve requests that do not involve accessing the database. As depicted in FIG. 3, instructions 342 may forward the API call to access the database to service layer 370 to process the API call. In other examples, API layer 340 may forward the API call to clustering layer 350.

Instructions 352 may intercept or otherwise receive the API call to access the database from API layer 340 at clustering layer 350. As discussed above, clustering layer 350 may be between API layer 340 and service layer 370. At clustering layer 350, instructions 354 may perform at least one of sharding the database and forwarding the API call, as described below and in relation to instructions 554 of FIG. 5. As used herein, sharding may refer to partitioning of a database between nodes in a multi-node cluster. For instance, a shard of a database may involve a horizontal partition of data in a database and each database shard may refer to an individual partition of the database. Each shard may be stored on a separate node and may be stored on a separate database instance associated with the node. In some examples, each node of a multi-node cluster may store a shard (or partition) of the database. In other examples, some, but not all, of the nodes of the multi-node cluster may store a shard of the database.

Instructions 354 of node 310 may shard the database via any sharding or partitioning technique. In one example, the database may be range partitioned. Range partitioning may map a database resource to a partition based on a range of values associated with a partitioning key. For instance, a database in which the partitioning key is a date column may comprise a database partition for each of the last three years. In such an example, a single database partition might contain rows with partitioning key values for each day of one of the years. In one example, when it has been determined that an API call to create a database resource has been received, the date associated with the database resource may be determined and an appropriate partitioning key assigned. Based on the partitioning key value, the database resource may be created within the appropriate database shard. In some examples, a database resource may also be retrieved via its partitioning key value.

In another example, instructions 354 may utilize a list partitioning technique. List partitioning may involve a partitioning key that comprises a list of discrete values. Such a technique may allow for partitioning or grouping unrelated sets of data within a database shard. In yet another example, instructions 354 may use a hash partitioning technique to shard the database. Hash partitioning may involve a hashing process that evenly distributes database rows across different partitions of a database. In such an example, each database resource may be assigned a hash key or identifier that maps to a particular partition of the database. The database resource may also be retrieved via its hash key or identifier.

In yet another example, instructions 354 may use any combination of range partitioning, list partitioning, and/or hash partitioning to shard the database. Sharding the database at clustering layer 350, between API layer 340 and service layer 350 may allow for the database to be automatically scaled agnostic to the database structure or framework and without modifying an API library within the API layer 350, service layer 370, or data access object layer 380. In sharding the database, instructions 354 may account for load balancing between each of the nodes within multi-node cluster 300.

Instructions 354 may also forward the API call. In some examples, instructions 354 may forward the API call from clustering layer 350 to services layer 370 to further process the API call. In other examples, instructions 354 may forward the API call from clustering layer 350 of node 310 to an API layer of another node in multi-node cluster 300. In yet other examples, instructions 354 may forward the API call from clustering layer 350 of node 310 to the API layer of each node in multi-node cluster 300.

Instructions 382 may access the database at the data access object layer 380. In some examples, if the API call to access the database is a request to create a database resource, data access object layer 380 may access the database to load or write the database resource to the database. If the API call to access the database is a request to retrieve a database resource, however, data access object layer 380 may extract or read the database resource from the database.

As described herein, instructions 342, 352, 354, and 382 may be executed within the described layers of an application framework. In some examples, instructions 342, 352, 354, and 382 may be part of an installation package that, when installed, may be executed by processing resource 320 to implement the functionalities described above. In such examples, storage medium 330 may be a portable medium, such as a CD, DVD, or flash drive, or a memory maintained by a server from which the installation package can be downloaded and installed. In other examples, instructions 342, 352, 354, and 382 may be part of an application, applications, or component(s) already installed on node 310 including processing resource 320. In such examples, the storage medium 330 may include memory such as a hard drive, solid state drive, or the like. In some examples, functionalities described herein in relation to FIG. 3 may be provided in combination with functionalities described herein in relation to any of FIGS. 1-2 and 4-9.

Figure 4:
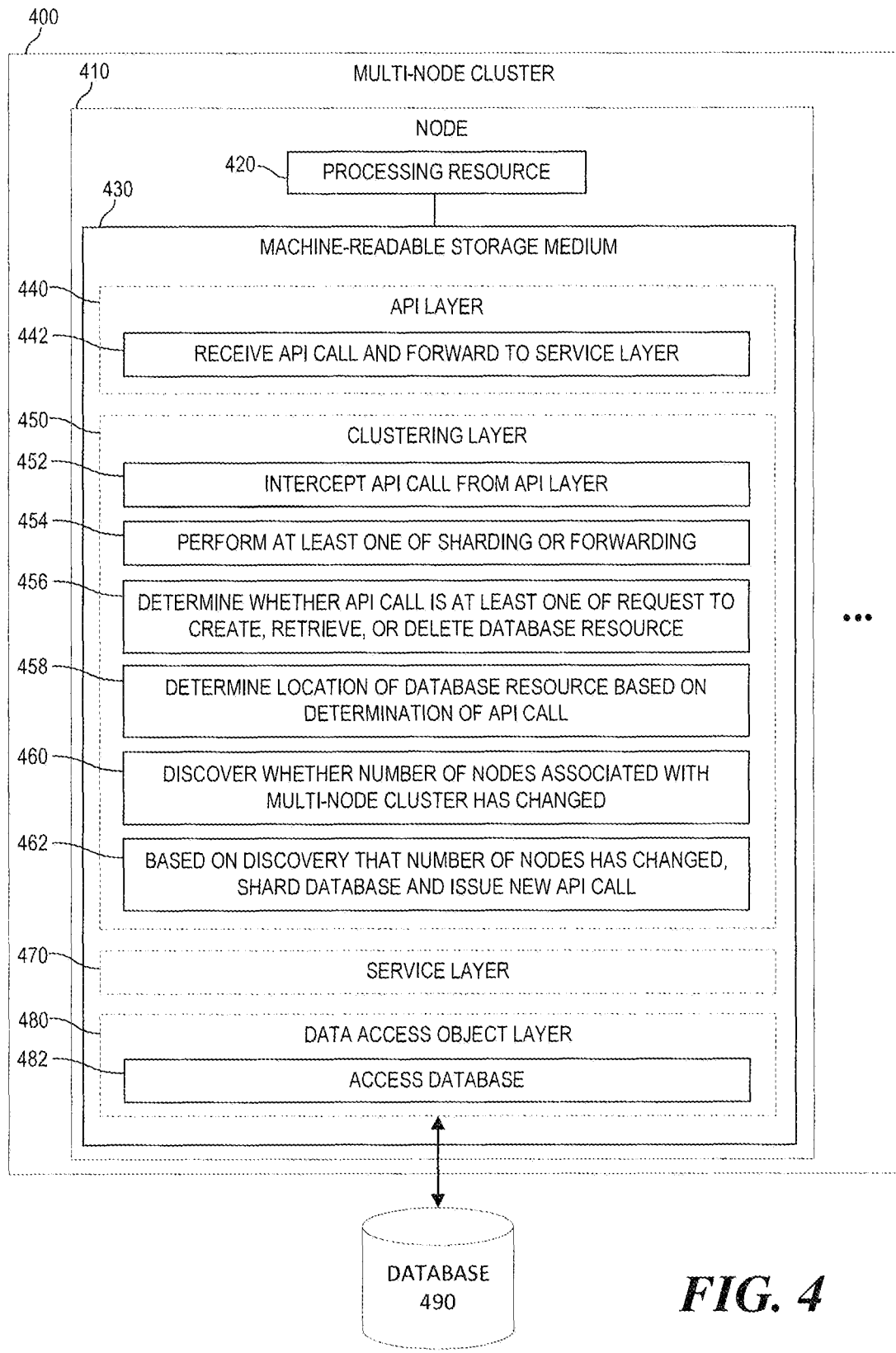
FIG. 4 is a block diagram of an example node in a multi-node cluster having a clustering layer to discover whether a number of nodes associated with the multi-node cluster has changed, and based on that discovery, shard a database.

Further examples are described herein in relation to FIG. 4, which is a block diagram of an example multi-node cluster 400 having a node 410, a processing resource 420, and a machine-readable storage medium 430 that includes instructions to discover whether a number of nodes associated with the multi-node cluster has changed and based (at least in part) on the determination that the number of nodes has changed, shard the database at the clustering layer.

As depicted in FIG. 4, device 400 may include a machine-readable storage medium 430 comprising (e.g., encoded with) instructions 442, 452, 454, 456, 458, 460, 462, and 482 executable by processing resource 420 to implement functionalities described herein in relation to FIG. 4. In some examples, storage medium 430 may include additional instructions. In other examples, the functionalities described herein in relation to instructions 442, 452, 454, 456, 458, 460, 462, 482, and any additional instructions described herein in relation to storage medium 430, may be implemented at least in part in electronic circuitry (e.g., via components comprising any combination of hardware and programming to implement the functionalities described herein).

Processing resource 420 may fetch, decode, and execute instructions stored on storage medium 430 to perform the functionalities described above in relation to instructions 442, 452, 454, 456, 458, 460, 462, and 482. In other examples, the functionalities of any of the instructions of storage medium 430 may be implemented in the form of electronic circuitry, in the form of executable instructions encoded on a machine-readable storage medium, or a combination thereof. In the example of FIG. 4, storage medium 430 may be implemented by one machine-readable storage medium, or multiple machine-readable storage media.

As depicted in the example of FIG. 4, machine-readable storage medium 430 may comprise several layers, including an API layer 440, a clustering layer 450, a service layer 470, and a data access object layer 480. These layers are similar to the API layer, clustering layer, service layer, and data access object layer described above in relation to FIGS. 2 and 3. As further depicted in the example of FIG. 4, data access object layer 480 may access a database 490. Database 490 may be any database suitable for use with a multi-node cluster, including a relational database, a dimensional database, a post-relational database, an object-oriented database, any combination of the above, or the like. In some examples, database 490 may be a relational structured query language database. Each of the layers may be implemented at least in part in electronic circuitry and via any combination of hardware and programming to implement the functionalities of the layers, as described below and in relation to FIGS. 2 and 3.

Instructions 442 of FIG. 4 may receive, at API layer 240, an API call to access database 490 and forward the API call to service layer 470, as described above in relation to instructions 342 of FIG. 3. Instructions 452 may intercept the API call from API layer 440 at clustering layer 450 between API layer 440 and service layer 470, as described above in relation to instructions 352 of FIG. 3. Instructions 454 may perform, at clustering layer 450, at least one of sharding the database or forwarding the API call, as described above in relation to instructions 354 of FIG. 3 and further described below in relation to instructions 554 of FIG. 5. At clustering layer 450, instructions 456 may determine whether the API call to access database 490 is at least one of a request to create a database resource, a request to retrieve a database resource, or a request to delete a database resource. In some such examples, instructions 456 of clustering layer 450 may determine that the API call is a set of requests to create, retrieve, and/or delete a database resource. For example, the API call may be a request to create, a request to retrieve, and/or a request to delete the database resource. In one example, if the API call is a request to move a database resource, instructions 456 may determine that the API call involves a request to retrieve the database resource from one location within the database, a request to delete the database resource at that location, and a request to create the database resource at another location within the database.

Based (at least in part) on the determination that the API call is at least one of a request to create, retrieve, or delete a database resource, instructions 458 may determine, at clustering layer 450, a location of the database resource based (at least in part) on the database resource and/or API call. In some examples, instructions 458 may determine that the location of the database resource is node 410. In other examples, instructions 458 may determine that the location of the database resource is another node within multi-node cluster 500. In yet other examples, instructions 458 may determine that the location of the database resource is unknown. Based (at least in part) on the partitioning technique used and information associated with the database resource and/or the API call, node 410 may determine the location of the database resource to be known or unknown.

In some examples, multi-node cluster 400 may employ a range partitioning technique, a list partitioning technique, and/or a hash partitioning technique to shard database 490. In some such examples, clustering layer 450 may include a table, a list, a key, or the like, to identify a range of database resources within each database shard. Based (at least in part) on a determination that the API call is a request to create a database resource, clustering layer 450 may assign an identifier to the database resource that maps to a particular database shard (or shards). In some examples, the identifier may be a partitioning key value or a hashing key. Accordingly, clustering layer 450 of node 410 may determine that the location of the database resource is known and is node 410 and/or another node within multi-node cluster 400.

Based (at least in part) on a determination that the API call is a request to retrieve or delete a database resource, clustering layer 450 may analyze the API call to determine a location of the database resource. In some examples, the API call may include an identifier such as a partitioning key value or hashing key. In such examples, clustering layer 450 may map the identifier to a particular database shard (or shards). In some examples, this may involve looking up the key or identifier within a table, list, or the like to determine the node at which the resource is located. Accordingly, clustering layer 450 of node 410 may determine that the location of the database resource is known and is node 410 and/or another node within multi-node cluster 400.

In some examples, an API call to retrieve or delete a database resource may not include a partitioning key value or hashing key, but may include another attribute that clustering layer 450 can map to a database shard via a table, a list, a key, or the like. For instance, in the range partitioning example described above, each database shard may be associated with database resources of a particular year. In such an example, clustering layer 450 may determine whether the API call identifies a year associated with the database resource. If so, clustering layer 450 may determine the location of the database resource by mapping the year to a particular database shard (or shards).

In other examples, an API call to retrieve or delete a database resource may not include a partitioning key value, hashing key, or other attribute by which clustering layer 450 can determine a location of the database resource. In such examples, clustering layer 450 may determine the location of the database resource to be unknown. Based (at least in part) on a determination of the location of the database resource, clustering layer may perform certain tasks, as described below in relation to instructions 556 of FIG. 5.

As depicted in the example of FIG. 4, instructions 460 may discover, at clustering layer 450, whether a number of nodes associated with a multi-node cluster has changed. In some examples, clustering layer 450 of node 410 may query each node within multi-node cluster 400 to determine if a new node has been added or a node has been removed. In other examples, each node engages in a gossip protocol amongst the nodes. In such examples, a new node within multi-node cluster 400 may announce via the gossip protocol that it has been added to the cluster. In some such examples, a node may also announce via the gossip protocol when it is to be removed. In some examples, each node within multi-node cluster 400 may conduct a discovery process. In such examples, one node of multi-node cluster 400 may be given priority to perform any tasks in response to discovering that a new node has been added or a node has been removed. In other such examples, the node that first discovers that the number of nodes has been changed may send a notification message to each node within the cluster that it will handle any responsive tasks. In yet other examples, a single node within multi-node cluster 400 may be assigned the task of discovering whether a number of nodes within the cluster has changed and performing responsive tasks.

Based (at least in part) on a discovery that a number of nodes in multi-node cluster 400 has changed, at clustering layer 450, instructions 462 may shard database 490, as described above in relation to instructions 354 of FIG. 3 and clustering layer 230 of FIG. 2. For instance, based (at least in part) on a determination that the number of nodes within multi-node cluster 400 has increased, database 490 may be sharded or partitioned to accommodate a new database shard. Database resources may be moved from some or all of the database shards associated with the nodes within multi-node cluster 400 to the new database shard associated with the new node. Based (at least in part) on a determination that the number of nodes within multi-node cluster 400 has decreased, database 290 may be sharded or partitioned to accommodate one fewer database shard. Database resources may be moved from the database shard of the removed node to database shards associated with some or all of the remaining nodes within multi-node cluster 400.

As discussed above in relation to FIG. 3, database 490 may be sharded via any sharding or partitioning technique, including any combination of range partitioning, list partitioning, and/or hash partitioning, or the like. In some examples, consistent hashing may be employed in which the moving of database resources is minimized when a hash table is resized. In such an example, a hash table may be resized such that K/n keys may need to be remapped on average, where K is the number of hash keys and n is the number of slots. Accordingly, consistent hashing may minimize moving of database resources, also minimizing any API calls used to implement the moving of database resources, described below.

Instructions 462 may also issue a new API call to implement the sharding of database 490. In one example, instructions 460 may issue a new API call to move resources from a database shard at node 410 within multi-node cluster 400 to another node within multi-node cluster 400. In such instances, the new API call may comprise a request to retrieve a database resource from node 410 and to create a database resource. Instructions 482 may access database 490, as described above in relation to instructions 382 of FIG. 3.

As described herein, instructions 442, 452, 454, 456, 458, 460, 462, and 482 may be executed within the described layers of an application framework. In some examples, instructions 442, 452, 454, 456, 458, 460, 462, and 482 may be part of an installation package that, when installed, may be executed by processing resource 420 to implement the functionalities described above. In such examples, storage medium 430 may be a portable medium, such as a CD, DVD, or flash drive, or a memory maintained by a server from which the installation package can be downloaded and installed. In other examples, instructions 442, 452, 454, 456, 458, 460, 462, and 482 may be part of an application, applications, or component(s) already installed on node 410 including processing resource 420. In such examples, the storage medium 430 may include memory such as a hard drive, solid state drive, or the like. In some examples, functionalities described herein in relation to FIG. 4 may be provided in combination with functionalities described herein in relation to any of FIGS. 1-3 and 5-9.

Figure 5:
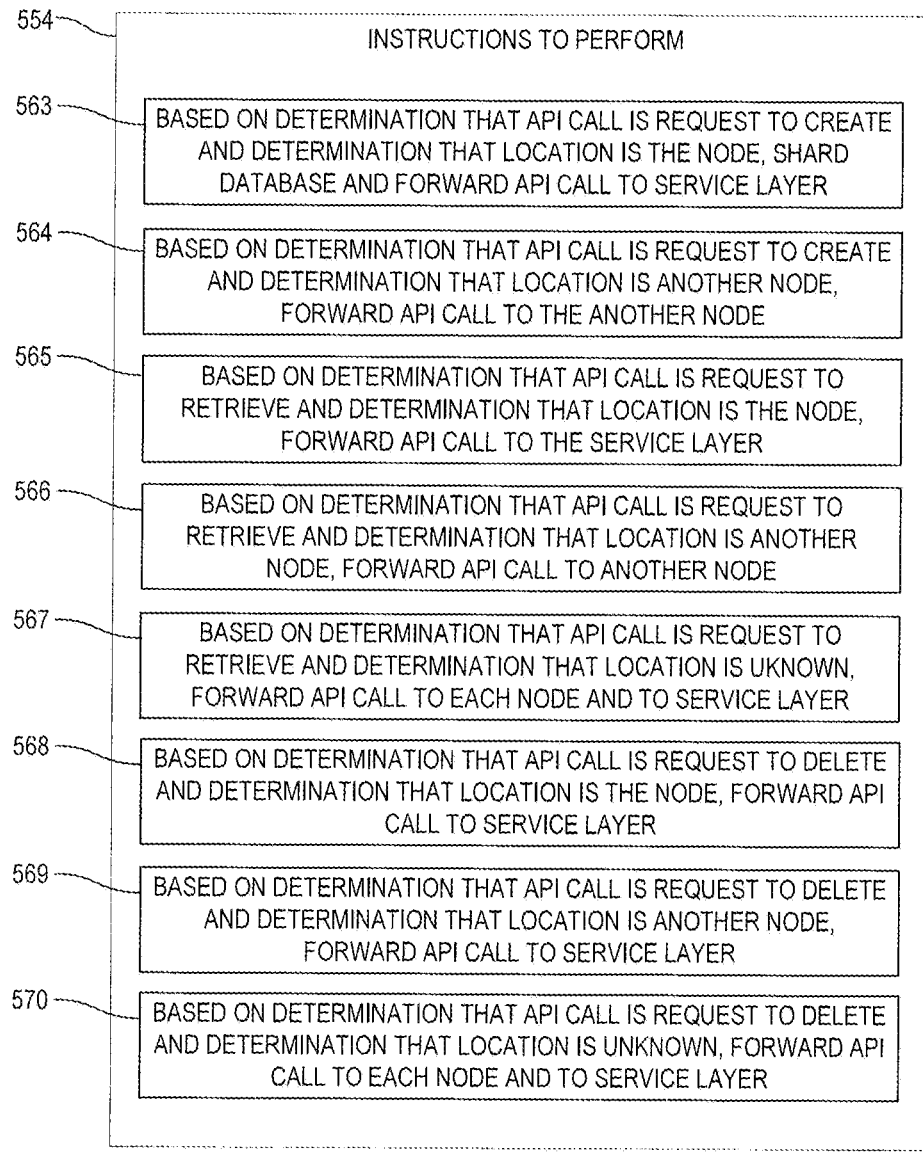
FIG. 5 is a block diagram of example instructions to perform at least one of sharding or forwarding at the clustering layer.

FIG. 5 is a block diagram of example instructions 554 to perform, at the clustering layer, at least one of sharding the database or forwarding an API call. As depicted in FIG. 5, instructions 554 may further comprise instructions 563, 564, 565, 566, 567, 568, 569, 570, and any additional instructions to implement the functionalities described herein. Instructions 563, 564, 565, 566, 567, 568, 569, 570, and any additional instructions described herein may be implemented as part of instructions 454 of FIG. 4. Although instructions 454 are described below with reference to node 410 of FIG. 4, other suitable nodes and systems can be utilized (e.g., node 310 of FIG. 3).

Based (at least in part) on a determination that the API call is the request to create the database resource and the determination that the location of the database resource is node 410, as described above in relation to instructions 456 and 458 of FIG. 4, instructions 563 may shard database 490 and forward the API call to service layer 470. Based (at least in part) on the partitioning technique used, clustering layer 450 may shard database 490 by assigning a partitioning key value, a hashing key, or other identifier that maps the database resource to the database shard associated with node

410. In some examples, clustering layer 450 may assign a hashing key via a hashing process that evenly distributes database resources amongst the nodes of multi-node cluster 400. In other examples, clustering layer 450 may assign a key based on an attribute of the database resource (e.g., a year or geographic location associated with the database resource). Instructions 563 may then forward the request to create the database resource, along with the assigned key or identifier, to service layer 470 for processing of the call. In some examples, service layer 470 may forward the API call to data access object layer 480 to create the database resource in database 490.

Based (at least in part) on the determination that the API call is the request to create the database resource and the determination that the location of the database resource is another node within multi-node cluster 400, as described above in relation to instructions 456 and 458 of FIG. 4, instructions 564 may forward the API call to the another node. Forwarding the API call to the another node may involve sending the API call to the API layer of the another node. In some examples, clustering layer 450 of node 410 may shard database 490 and assign a partitioning key, a hashing key, or other identifier to the database resource prior to forwarding the API call to the another node. In such examples, clustering layer 450 may forward the API call with the assigned partitioning key, hashing key, or other identifier that maps the database resource to the database shard of the other node. In some examples, the database resource may be created in more than one database shard of database 490 for purposes of fault tolerance and redundancy.

Based (at least in part) on a determination that the API call is the request to retrieve the database resource and the determination that the location of the database resource is node 210, as described above in relation to instructions 456 and 458 of FIG. 4, instructions 565 may forward the API call to service layer 470 to process the call. In some examples, service layer 470 may forward the API call to data access object layer 480 to retrieve the database resource from database 490.

Based (at least in part) on a determination that the API call is the request to retrieve the database resource and the determination that the location of the database resource is another node within multi-node cluster 400, as described above in relation to instructions 456 and 458 of FIG. 4, instructions 566 may forward the API call to the another node. Forwarding the API call to the another node may involve sending the API call to the API layer of the another node within multi-node cluster 400 to retrieve the database resource.

In some examples, database 490 may practice redundancy such that a database resource's partitioning key, hashing key, or other identifier maps to more than one node within multi-node cluster 400. In such examples, a consistency level may be defined for multi-node cluster 400 to manage availability of the database resource against data accuracy. In some such examples, a successful retrieve operation may involve strict consistency requirements between each node that stores the database resource. In other such examples, a successful retrieve operation may tolerate some level of failure and consistency requirements may be more lenient. Based (at least in part) on a determination of the location of the database resource and the defined consistency level, in some examples, clustering layer 450 may both forward the API call to another node within multi-node cluster 400 and also forward the API call to service layer 470. In other examples, clustering layer 450 may forward the API call to multiple, but not all, nodes within multi-node cluster 400.

Based (at least in part) on a determination that the API call is the request to retrieve the database resource and the determination that the location of the database resource is unknown, as described above in relation to instructions 456 and 458 of FIG. 4, instructions 567 may forward the API call to each node of multi-node cluster 400 and to service layer 470 of node 410. In some examples clustering layer 450 may forward, multi-cast, or otherwise send the API call to each node's API layer and to service layer 470 of node 410 to retrieve the database resource. In some such examples, clustering layer 450 may add a header or other field to the API call to inform each node of multi-node cluster 400 that the API call has been broadcast to each node to prevent each of the clustering layers of each of the nodes from re-broadcasting the API call to all nodes.

In some examples, in which the API call retrieves a collection of database resources, clustering layer 450 may receive the collected database resources and perform a sort merge operation to filter, sort, merge, and otherwise organize the retrieved database resources. For example, a search request may result in the collection of several database resources across nodes. In such an example, the retrieved set or collection of database resources may be sorted and merged at clustering layer 450 before it is returned to the requesting client device, user, or consumer.

Based (at least in part) on a determination that the API call is the request to delete a the database resource and the determination that the location of the database resource is node 410, as described above in relation to instructions 456 and 458 of FIG. 4, instructions 568 may forward the API call to service layer 470. Service layer 470 may then forward the request to delete the database resource to data access object layer 480 to delete the resource from database 490.

Based (at least in part) on a determination that the API call is the request to delete the database resource and the determination that the location of the database resource is another node within multi-node cluster 400, as described above in relation to instructions 456 and 458 of FIG. 4, instructions 569 at clustering layer 450 may forward the API call to the another node. Forwarding the API call to the another node may involve sending the API call to the API layer of the another node within multi-node cluster 400 to delete the database resource.

Based (at least in part) on the determination that the API call is the request to delete the database resource and the determination that the location of the database resource is unknown, as described above in relation to instructions 456 and 458 of FIG. 4, instructions 570 may forward the API call to each node of multi-node cluster 400. In some examples, clustering layer 450 may forward, multi-cast, or otherwise send the API call to each node's API layer node to delete the database resource as well as to service layer 470 of node 410. In some such examples, clustering layer 450 may add a header or other field to the API call to inform each node of multi-node cluster 400 that the API call has been broadcast to each node to prevent each of the clustering layers of each of the nodes from re-broadcasting the API call to all nodes.

As described herein, instructions 563, 564, 565, 566, 567, 568, 569, 570, and any additional functionalities described above may be executed within clustering layer 450 as part of instructions 454. In some examples, instructions 563, 564, 565, 566, 567, 568, 569, and 570 may be part of an installation package that, when installed, may be executed by processing resource 420 to implement the functionalities described above. In such examples, storage medium 430 may be a portable medium, such as a CD, DVD, or flash drive, or a memory maintained by a server from which the installation package can be downloaded and installed. In other examples, instructions 563, 564, 565, 566, 567, 568, 569, and 570 may be part of an application, applications, or component(s) already installed on node 410 including processing resource 420. In such examples, the storage medium 430 may include memory such as a hard drive, solid state drive, or the like. In some examples, functionalities described herein in relation to FIG. 5 may be provided in combination with functionalities other than those described in FIG. 4, including in relation to any of FIGS. 1-3 and 6-9.

Figure 6:
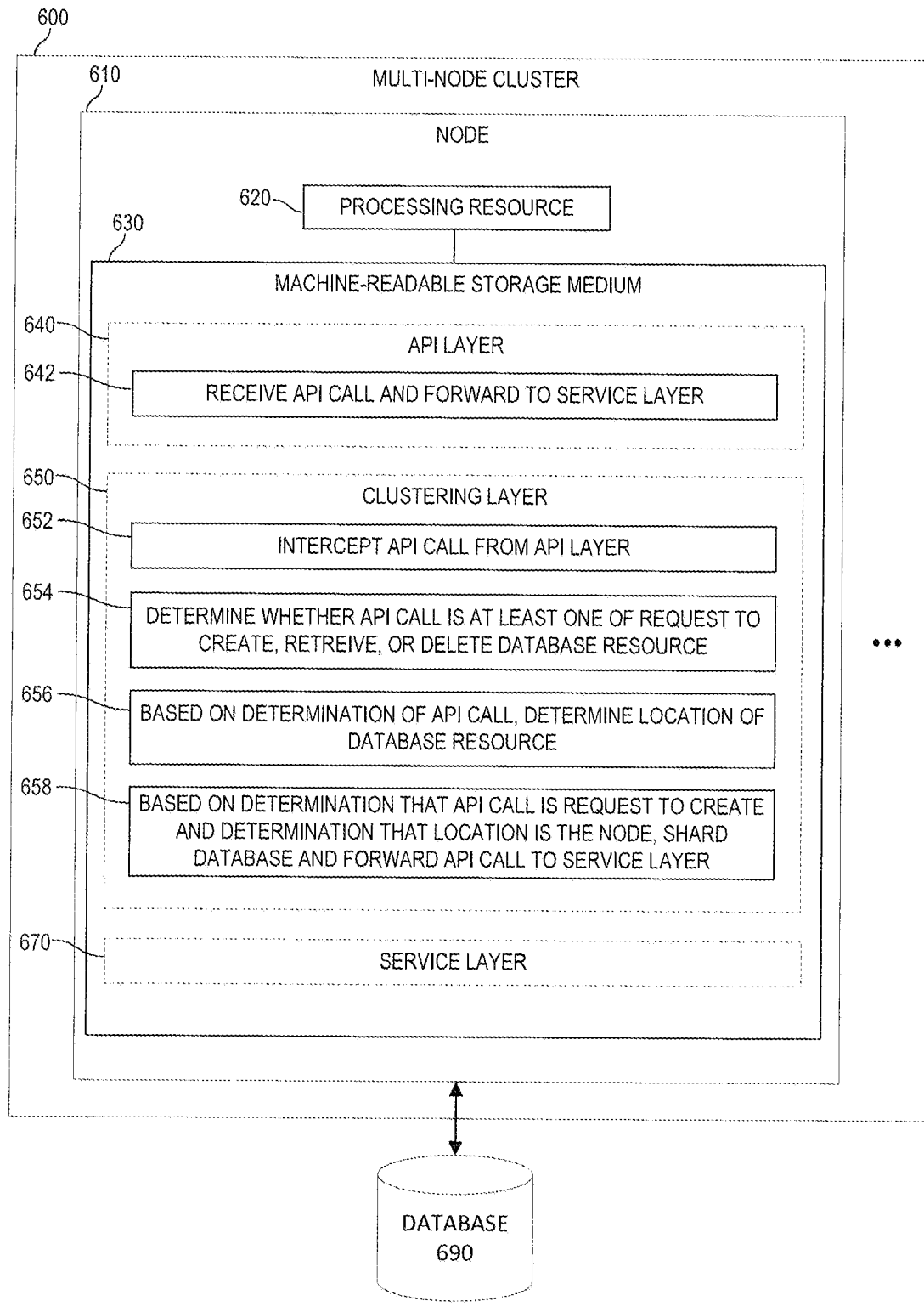
FIG. 6 is a block diagram of an example machine-readable storage medium including instructions to determine whether an API call is at least one of a request to create, to retrieve, and to delete a database resource, to determine a location of the database resource, and based on the determinations, perform certain tasks at the clustering layer.

Further examples are described herein in relation to FIG. 6, which is a block diagram of an example machine-readable storage medium 630 that includes instructions to determine whether an API call is at least one of a request to create, retrieve, or delete a database resource, instructions to determine a location of the database resource, and based (at least in part) on those determinations, shard the database at a clustering layer. The example of FIG. 6 includes machine-readable storage medium 630 comprising instructions 642, 652, 654, 656, and 658, executable by a processing resource 620 of node 610 within multi-node cluster 600.

As depicted in the example of FIG. 6, machine-readable storage medium 630 may comprise several layers, including an API layer 640, a clustering layer 650, and a service layer 670. These layers are similar to the API layer, clustering layer, and service layer described above in relation to FIGS. 2-4. While FIG. 6 depicts three layers, an application may utilize more or less layers as appropriate. Each of the layers may be implemented at least in part in electronic circuitry and via any combination of hardware and programming to implement the functionalities of the layers, as described below and in relation to FIGS. 2-4. In some examples, node 610 may access database 690 via a data access object layer (not shown). As described above, database 690 may be any database suitable for use with a multi-node cluster.

Instructions 642 may receive an API call at API layer 640 and forward the API call to service layer 670. In some examples, the API call may be received from a client device such as another node. In other examples, the API call may be received via a user interface from a user or consumer of the application. The API call may include a request to access database 690 or may be unrelated to accessing database 690. As described above in relation to instructions 342 of FIG. 3, the API call may comprise a request to create a database resource in the database, a request to retrieve a database resource from the database, a request to delete a database resource in the database, a request to move a database resource in the database, or a request to modify a database resource in the database. A request to move a database resource and a request to modify a database resource may comprise a request to retrieve, delete, and/or create the database resource. As depicted in FIG. 6, instructions 642 may forward the API call to service layer 670 to process the API call. In other examples, API layer 640 may forward the API call to clustering layer 650.

Instructions 652 may intercept, at clustering layer 650, the API call from API layer 640, as described above in relation to instructions 452 of FIG. 4. Instructions 654 may determine whether the API call is at least one of a request to create, to retrieve, or to delete a database resource from database 690, as described above in relation to instructions 456 of FIG. 4. Based (at least in part) on a determination that the API call is at least one of the request to create, to retrieve, or to delete the database resource, instructions 656 may determine, at clustering layer 650, a location of the database resource, as described above in relation to instructions 458 of FIG. 4.

Based (at least in part) on the determination that the API call is the request to create the database resource and the determination that the database resource is located at node 610, instructions 658 may, at clustering layer 650, shard database 690 and forward the API call to service layer 670, as described above in relation to instructions 563 of FIG. 5.

As described herein, instructions 642, 652, 654, 656, and 658 may be executed within the described layers of an application framework. In some examples, instructions 642, 652, 654, 656, and 658 may be part of an installation package that, when installed, may be executed by processing resource 620 to implement the functionalities described above. In such examples, storage medium 630 may be a portable medium, such as a CD, DVD, or flash drive, or a memory maintained by a server from which the installation package can be downloaded and installed. In other examples, instructions 642, 652, 654, 656, and 658 may be part of an application, applications, or component(s) already installed on node 610 including processing resource 620. In such examples, the storage medium 630 may include memory such as a hard drive, solid state drive, or the like. In some examples, functionalities described herein in relation to FIG. 6 may be provided in combination with functionalities described herein in relation to any of FIGS. 1-5 and 7-9.

Figure 7:
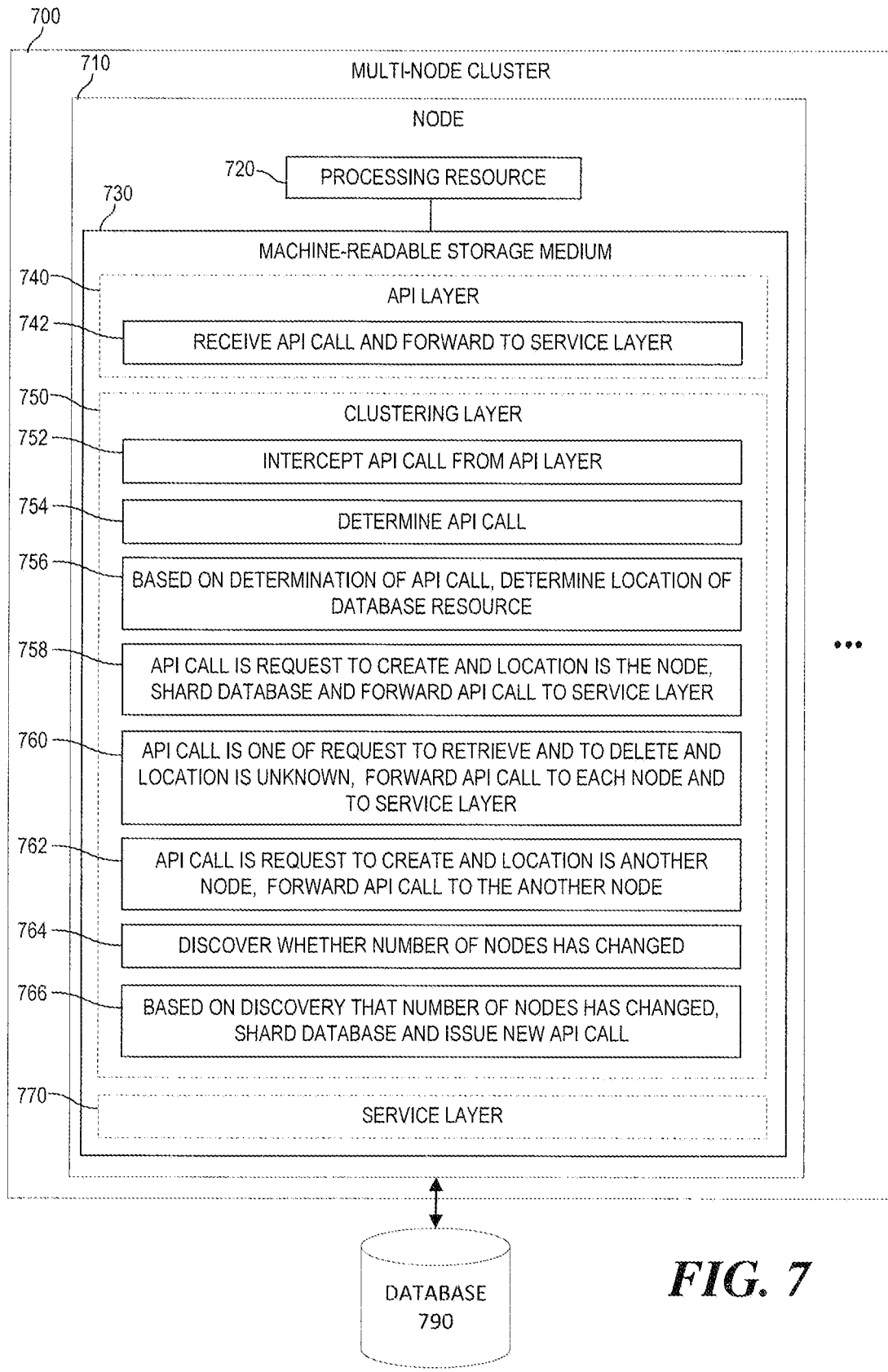
FIG. 7 is a block diagram of an example machine-readable storage medium including instructions to discover whether a number of nodes associated with the multi-node cluster has changed, and based on that discovery, shard a database.

FIG. 7 is a block diagram of an example machine-readable storage medium 730 that includes instructions to determine whether an API call is at least one of a request to create, to retrieve, and to delete a database resource, instructions to discover whether a number of nodes within multi-node cluster 700 has changed, and based (at least in part) on the determination or the discovery, perform actions at a clustering layer. The example of FIG. 7 includes machine-readable storage medium 730 comprising instructions 742, 752, 754, 756, 758, 760, 762, 764, and 766 executable by a processing resource 720 of node 710 within multi-node cluster 700.

As depicted in the example of FIG. 7, machine-readable storage medium 730 may comprise several layers, including an API layer 740, a clustering layer 750, and a service layer 770. These layers are similar to the API layer, clustering layer, and service layer described above in relation to FIGS. 2-4. While FIG. 7 depicts three layers, an application may utilize more or less layers as appropriate. Each of the layers may be implemented at least in part in electronic circuitry and via any combination of hardware and programming to implement the functionalities of the layers, as described below and in relation to FIGS. 2-4. Node 710 may also access database 790. In some examples, node 710 may access database 790 via a data access object layer (not shown). As described above, database 790 may be any database suitable for use with a multi-node cluster.

Instructions 742 may receive an API call at API layer 740 and forward the API call to service layer 770, as described above in relation to instructions 642 of FIG. 6. Instructions 752 may intercept, at clustering layer 750, the API call from API layer 740, as described above in relation to instructions 652 of FIG. 6. Instructions 754 may determine whether the API call is at least one of a request to create a database resource, a request to retrieve a database resource, or a request to delete a database resource from database 790, as described above in relation to instructions 654 of FIG. 6. Based (at least in part) on a determination that the API call is at least one of a request to create, to retrieve, or to delete the database resource, instructions 756 may determine, at clustering layer 750, a location of the database resource, as described above in relation to instructions 656 of FIG. 6.

Based (at least in part) on a determination that the API call is the request to create the database resource and the determination that the database resource is located at node 710, instructions 758 may, at clustering layer 750, shard database 790 and forward the API call to service layer 770, as described above in relation to instructions 658 of FIG. 6. Based (at least in part) on a determination that the API call is at least one of the request to retrieve or the request to delete the database resource and the determination that the location of the database resource is unknown, instructions 760 may, at clustering layer 750, forward the API call to each node of multi-node cluster 700 and to service layer 770, as described above in relation to instructions 567 and 570 of FIG. 5. Based (at least in part) on a determination that the API call is a request to create a database resource and a determination that the database resource is located at another node within multi-node cluster 700, instructions 762 may, at clustering layer 750, forward the API call to the another node, as described above in relation to instructions 564 of FIG. 5.

Instructions 764 may discover, at clustering layer 750, whether a number of nodes associated with multi-node cluster 700 has changed, as described above in relation to instructions 460 of FIG. 4. Based (at least in part) on the discovery that the number of nodes has changed, instructions 766 may shard database 790 and issue a new API call to API layer 740, as described above in relation to instructions 462 of FIG. 4. Instructions 766 may issue the new API call to implement the sharding of database 790. In one example, the new API call may result in moving resources from a database shard at node 710 within multi-node cluster 700 to another node within multi-node cluster 700.

As described herein, instructions 742, 752, 754, 756, 758, 760, 762, 764, and 766 may be executed within the described layers of an application framework. In some examples, instructions 742, 752, 754, 756, 758, 760, 762, 764, and 766 may be part of an installation package that, when installed, may be executed by processing resource 720 to implement the functionalities described above. In such examples, storage medium 730 may be a portable medium, such as a CD, DVD, or flash drive, or a memory maintained by a server from which the installation package can be downloaded and installed. In other examples, instructions 742, 752, 754, 756, 758, 760, 762, 764, and 766 may be part of an application, applications, or component(s) already installed on node 710 including processing resource 720. In such examples, the storage medium 730 may include memory such as a hard drive, solid state drive, or the like. In some examples, functionalities described herein in relation to FIG. 7 may be provided in combination with functionalities described herein in relation to any of FIGS. 1-6 and 8-9.

Figure 8:
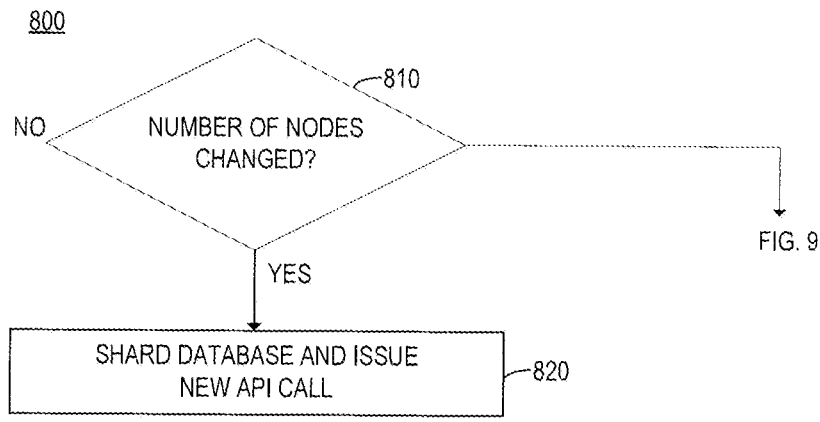
FIG. 8 is a flow chart of an example method for a node in a multi-node cluster including discovering whether a number of nodes associated with multi-node cluster has changed, and based on that discovery, sharding the database.

FIG. 8 is a flowchart of an example method 800 for a node in a multi-node cluster including discovering whether a number of nodes associated with the multi-node cluster has changed and based (at least in part) on the discovery that the number of nodes has changed, at a clustering layer, sharding a database and issuing a new API call. Although execution of method 800 is described below with reference to node 410 in multi-node cluster 400 of FIG. 4, other suitable nodes for the execution of method 800 can be utilized (e.g., node 310 in multi-node cluster 300 of FIG. 3). Additionally, implementation of method 800 is not limited to such examples.

In the example of FIG. 8, method 800 may be a method of node 410 of multi-node cluster 400. Node 410 may comprise a processing resource 420. At 810, instructions 460 may discover, at clustering layer 450 between API layer 440 and service layer 470, whether a number of nodes associated with the multi-node cluster has changed. This discovery may be performed by processing resource 420 of node 410, as described above in relation to instructions 460 of FIG. 4. In some examples, instructions 460 may query each node within multi-node cluster 400 to determine if a new node has been added or a node has been removed. In other examples, each node engages in a gossip protocol amongst the nodes.

At 820, based (at least in part) on the discovery that the number of nodes associated with the multi-node cluster has changed, at clustering layer 450, instructions 462 shard the database and issue a new API call to API layer 440, as described above in relation to instructions 462 of FIG. 4. In some examples, instructions 462 may shard the database to accommodate a new database shard or to accommodate the removal of a database shard. Instructions 462 may issue a new API call to move database resources from one database shard to another database shard.

Although the flowchart of FIG. 8 shows a specific order of performance of certain functionalities, method 800 is not limited to that order. For example, the functionalities shown in succession in the flowchart may be executed concurrently or with partial concurrence, or a combination thereof. In some examples, functionalities described herein in relation to FIG. 8 may be provided in combination with functionalities described herein in relation to any of FIGS. 1-7, and 9.

FIG. 9 is a flowchart of an example method 900 for a node in a multi-node cluster including determining whether an API call is at least one of a request to create, to retrieve, and to delete a database resource, and based on the determination, performing, at a clustering layer, sharding of a database and forwarding the API call.

In the example of FIG. 9, method 900 may be a method of node 410 (though other suitable nodes may also be used). At 910, clustering layer 450 may receive an API call from API layer 440. The API call may include a request to access database 490 or may be unrelated to accessing database 490. In some examples, API layer 440 may forward the API call to clustering layer 450. In other examples, as described above, API layer 440 may send the API call to service layer 470 and clustering layer 450 may intercept the API call. At 920, instructions 456 at clustering layer 450 may determine whether the API call is at least one of a request to create a database resource, a request to retrieve a database resource, or a request to delete a database resource, as described above in relation to instructions 456 of FIG. 4.

Based (at least in part) on a determination that the API call is not at least one of the request to create, to retrieve, or to delete the database resource, method 900 may proceed to 930. At 930, clustering layer 450 may forward the API call to service layer 470 for further processing. Based (at least in part) on the determination that the API call is at least one of the request to create, to retrieve, or to delete the database resource, method 900 may proceed to 940. At 940, instructions 458 of clustering layer 450 may determine a location of the database resource, as described above in relation to instructions 458 of FIG. 4. At 950, instructions 454 and/or instructions 554 of clustering layer 450 may perform at least one of sharding the database or forwarding the API call, as described above in relation to instructions 454 of FIG. 4 and instructions 554 of FIG. 5.

In some examples, based on the API call and the location of the database resource, clustering layer 450 may shard the database and/or forward the API call. In other examples, based on the API call and the location of the database resource, clustering layer may forward the API call to service layer 470, to another node within multi-node cluster 400, or to each node within multi-node cluster 400.

Although the flowchart of FIG. 9 shows a specific order of performance of certain functionalities, method 900 is not limited to that order. For example, the functionalities shown in succession in the flowchart may be performed in a different order, may be executed concurrently or with partial concurrence, or a combination thereof. In some examples, functionalities described herein in relation to FIG. 9 may be provided in combination with functionalities described herein in relation to any of FIGS. 1-8.

What is claimed is:

1. A first node for a multi-node cluster, comprising:
a processing resource;
a non-transitory machine-readable storage medium comprising instructions executable by the processing resource to:
receive, at an application programming interface (API) layer, an API call from a client to access a database resource;
intercept the API call from the API layer at a clustering layer between the API layer and a service layer;
determine, at the clustering layer, whether the database resource of the API call is located in the first node or in a second node of the multi-node cluster;
discover, at the clustering layer, whether a number of nodes of the multi-node cluster has changed; and
based on discovering that the number of the nodes of the multi-node cluster has changed, issue, at the clustering layer, further API calls for sharding of a database including moving database resources between the nodes of the multi-node cluster, the further API calls comprising:
a first further API call that when issued by the clustering layer to an API layer of the second node causes retrieval of the database resources from the second node, and
a second further API call that when issued by the clustering layer to an API layer of a third node of the multi-node cluster causes creation of the database resources at the third node.

2. The first node of claim 1, wherein the sharding of the database includes load-balancing between the nodes of the multi-node cluster.

3. The first node of claim 1, wherein the instructions are executable by the processing resource to:
determine whether the API call from the client is at least one of a request to create the database resource in the database, a request to retrieve the database resource in the database, or a request to delete the database resource in the database.

4. The first node of claim 3, wherein the instructions are executable by the processing resource to:
based on the determination that the API call from the client is at least one of the request to create, retrieve, or delete the database resource, determine, at the clustering layer, a location of the database resource.

5. The first node of claim 4, wherein the instructions are executable by the processing resource to:
based on the determination that the API call is the request to retrieve the database resource and based on the determination that the location of the database resource is unknown, forward the API call from the client to each node of the multi-node cluster and to the service layer.

6. The first node of claim 4, wherein the instructions are executable by the processing resource to:
based on the determination that the API call is the request to delete the database resource and based on the determination that the location of the database resource is unknown, forward the API call from the client to each node of the multi-node cluster and to the service layer.

7. The first node of claim 1, wherein the sharding of the database uses a partitioning technique to partition database resources of the database among the nodes of the multi-node cluster.

8. The first node of claim 1, wherein the number of the nodes of the multi-node cluster has changed responsive to adding a new node to the multi-node cluster or removing an existing node from the multi-node cluster.

9. The first node of claim 8, wherein the first node is to use a gossip protocol to communicate with other nodes of the multi-node cluster regarding the adding of the new node or the removing of the existing node.

10. The first node of claim 1, wherein the instructions are executable by the processing resource to:
in response to determining that the database resource is located in the first node, forward, at the clustering layer, the API call to the service layer that processes the API call to cause access of the database resource;
in response to determining that the database resource is located in another node, forward, at the clustering layer, the API call to an API layer of the another node.

11. The first node of claim 1, wherein the third node is a new node added to the multi-node cluster, and the first node and the second node are existing nodes of the multi-node cluster prior to the change of the number of the nodes of the multi-node cluster.

12. An article comprising at least one non-transitory machine-readable storage medium comprising instructions executable by a processing resource of a first node of a multi-node cluster to:
receive, at an application programming interface (API) layer of the first node, an API call;
intercept, at a clustering layer between the API layer and a service layer of the first node, the API call from the API layer;
determine a location of a database resource to be accessed by the API call;
in response to a determination that the location of the database resource is in the first node, forward, at the clustering layer, the API call to the service layer;
in response to a determination that the location of the database resource is in a second node of the multi-node cluster, forward, at the clustering layer, the API call to the second node;
discover, at the clustering layer, whether a number of nodes of the multi-node cluster has changed; and
based on discovering that the number of the nodes of the multi-node cluster has changed, issue, at the clustering layer, further API calls for sharding of a database including moving database resources of the database between the nodes of the multi-node cluster, the further API calls comprising:
a first further API call that when issued by the clustering layer to an API layer of the second node causes retrieval of the database resources from the second node, and a second further API call that when issued by the clustering layer to an API layer of a third node of the multi-node cluster causes creation of the database resources at the third node.

13. The article of claim 12, wherein the instructions are executable by the processing resource of the first node to:
in response to a determination that the location of the database resource is unknown, forward, at the clustering layer, the API call to each node of the multi-node cluster and to the service layer.

14. The article of claim 12, wherein the sharding of the database uses a partitioning technique to partition database resources of the database among the nodes of the multi-node cluster.

15. The article of claim 12, wherein the number of the nodes of the multi-node cluster has changed responsive to adding a new node to the multi-node cluster or removing an existing node from the multi-node cluster.

16. The article of claim 15, wherein the instructions are executable by the processing resource of the first node to use a gossip protocol to communicate with other nodes of the multi-node cluster regarding the adding of the new node or the removing of the existing node.

17. The article of claim 12, wherein the third node is a new node added to the multi-node cluster, and the first node and the second node are existing nodes of the multi-node cluster prior to the change of the number of the nodes of the multi-node cluster.

18. A method comprising:
discovering, by a processing resource of a first node of a multi-node cluster, at a clustering layer of the first node between an application programming interface (API) layer of the first node and a service layer of the first node, whether a number of nodes of the multi-node cluster has changed;
based on discovering that the number of the nodes of the multi-node cluster has changed, issuing, at the clustering layer, API calls for sharding of a database including moving database resources between the nodes of the multi-node cluster, the API calls comprising:
a first API call that when issued by the clustering layer to an API layer of a second node of the multi-node cluster causes retrieval of the database resources from the second node, and
a second API call that when issued by the clustering layer to an API layer of a third node of the multi-node cluster causes creation of the database resources at the third node;
receiving, at the clustering layer, a further API call from the API layer of the first node that received the further API call from a client, the further API call to access a database resource;
determining, at the clustering layer, whether the database resource of the further API call is located in the first node or in the second node;
in response to determining that the database resource is located in the first node, forwarding, at the clustering layer, the further API call to the service layer that processes the further API call to cause access of the database resource; and
in response to determining that the database resource is located in the second node, forwarding, at the clustering layer, the further API call to the API layer of the second node.

19. The method of claim 18, further comprising:
determining, at the clustering layer, whether the further API call is at least one of a request to create the database resource in the database, retrieve the database resource from the database, or delete the database resource from the database,
wherein the determination of whether the database resource is located in the first node or the second node is in response to the determination that the further API call is at least one of the request to create, retrieve, or delete the database resource.

20. The method of claim 18, wherein the third node is a new node added to the multi-node cluster, and the first node and the second node are existing nodes of the multi-node cluster prior to the change of the number of the nodes of the multi-node cluster.

* * * * *